United States Patent [19]  
Wada et al.

[11] 4,300,163  
[45] Nov. 10, 1981

[54] SOLID-STATE IMAGING APPARATUS

[75] Inventors: Takamichi Wada, Hirakata; Yasuaki Terui, Neyagawa, both of Japan

[73] Assignee: Matsushita Electric Industrial Co., Ltd., Osaka, Japan

[21] Appl. No.: 101,176

[22] Filed: Dec. 7, 1979

[30] Foreign Application Priority Data

Dec. 8, 1978 [JP] Japan ............................. 53-152367

[51] Int. Cl.³ .......................................... H04N 5/34
[52] U.S. Cl. .................................... 358/163; 358/213
[58] Field of Search ............... 358/163, 209, 212, 213

[56] References Cited
U.S. PATENT DOCUMENTS
4,200,934  4/1980  Hofmann ............................. 358/163

Primary Examiner—Richard Murray

Attorney, Agent, or Firm—Stevens, Davis, Miller & Mosher

[57] ABSTRACT

A solid-state imaging apparatus has an imaging unit which is partly shielded against incident light to produce an optically shielded signal. A memory unit is provided for storing the optically shielded signal as a dark state signal during one horizontal scanning period. A line defect signal representative of a line defect present in the imaging unit is stored in the memory unit during the one horizontal scanning period. An optical signal of the imaging unit and a dark state signal stored in the memory unit during the one horizontal scanning period are subtracted so that the line defect signal contained in the optical signal of the imaging unit and the dark state signal are cancelled out to produce a signal having no line defect.

6 Claims, 22 Drawing Figures

SOLID-STATE IMAGING APPARATUS

BACKGROUND OF THE INVENTION

Generally, a solid-state imaging apparatus such as an image pickup apparatus or an image sensor is constituted by a light receiving section for picking up an optical image signal and a shifting section for shifting a picked-up image signal. If various defects incident to the manufacturing process of the solid-state imaging apparatus take place in the light receiving section or the shifting section, black or white lines in the form of a black and white stripe pattern is displayed on the screen, thereby degrading the quality a picture reproduced thereon. When the light receiving section is constituted by PN photodiodes, for example, the defective picture is thought due to a large leakage in the PN photodiode which results from defects in a diffused layer caused in the manufacturing process. The large leakage causes excessive carriers to flow into shifting stages via transfer MOS transistors connected thereto and in addition, the excessive carriers prevailing in one stage of the shifting section immigrate into adjacent stages, resulting in a so-called overflow. If the overflow carriers prevail in the shifting section in one column, the one column is displayed as a white line on the screen.

When the shifting section is constituted by charge transfer devices such as a BBD or CCD device, irregularities in the thickness of an insulating oxide film or formation of pinholes in the insulating oxide film may be produced in the manufacturing process. The pinholes thus formed in the insulating film cause the transfer pulse voltage to be sent to the shifting stage as a spurious information signal. The spurious information signal is added to optical information and displayed as a defective black or white line on the screen.

Various approaches have been tried to improve the manufacturing process in order to eliminate the defective stripe pattern on the screen incident to the manufacting a process, however difficulties in obtaining a high yield rate of production of the solid-state imaging apparatus have been encountered as such an apparatus occupies a much larger area, e.g., several to ten square mm, than other IC circuits. Accordingly, for correcting the stripe pattern it has also been proposed to employ an external circuit which detects the position of a line defect and corrects the same. This method uses an ROM (Read Only Memory) for storing the position and size of a line defect. More particularly, the size of the line defect is quantized into a digital value and stored in the ROM. Then, a portion of an image signal corresponding to the position of the line defect and the information from the ROM are differentiated to correct the line defect. This method is, however, disadvantageous as it requires the provision of separate ROMs for separate devices and a complicated external circuit.

Essentially, a solid-state imaging apparatus is a finely fabricated, large-area integrated circuit device and if subjected to defects in the light receiving section caused in the manufacturing process, it suffers from line defects such as white lines or black lines displayed on the screen.

Line defects are displayed as black or white lines on the screen even when the light receiving section of the solid-state imaging apparatus is not irradiated with light. If the solid-state imaging apparatus is provided with a light receiving section for picking up an optical signal representative of an optical object which is usually converted into an electric signal and a light shielded section shielded from the incident light, it is possible to obtain a signal representative of the line defect through the light shielded section and a signal representative of a mixture of optical signal and line defect through the light receiving section.

SUMMARY OF THE INVENTION

Accordingly, it is an object of this invention to provide a solid-state imaging apparatus which can eliminate a line defect signal contained in an optical signal from a light receiving section by reading out, upon reading out of the optical signal from the light receiving section, the difference between the optical signal and the line defect signal which has been derived from a signal from the light shielded section and stored in a memory unit during reading out of the optical signal.

In the solid-state imaging apparatus, the received optical image signals which are produced by a two-dimensional image pick-up surface of the apparatus are taken out as a time sequential signal by horizontally and vertically scanning, the picked-up optical signals representative of the object being read out sequentially on a time basis. According to the invention, the solid-state imaging apparatus comprises a light receiving section for picking up the optical signal and a light shielded section for shielding the incident light. During the initial phase of the vertical scanning, signals from the light shielded section are transferred to a memory unit and stored therein as line defect signals. Then, during the horizontal scanning of the light receiving section, the memory unit is also scanned and signals of the light receiving section and the memory unit are differenced to correct the line defect.

DESCRIPTION OF THE PREFERRED EMBODIMENTS

Figure 1:
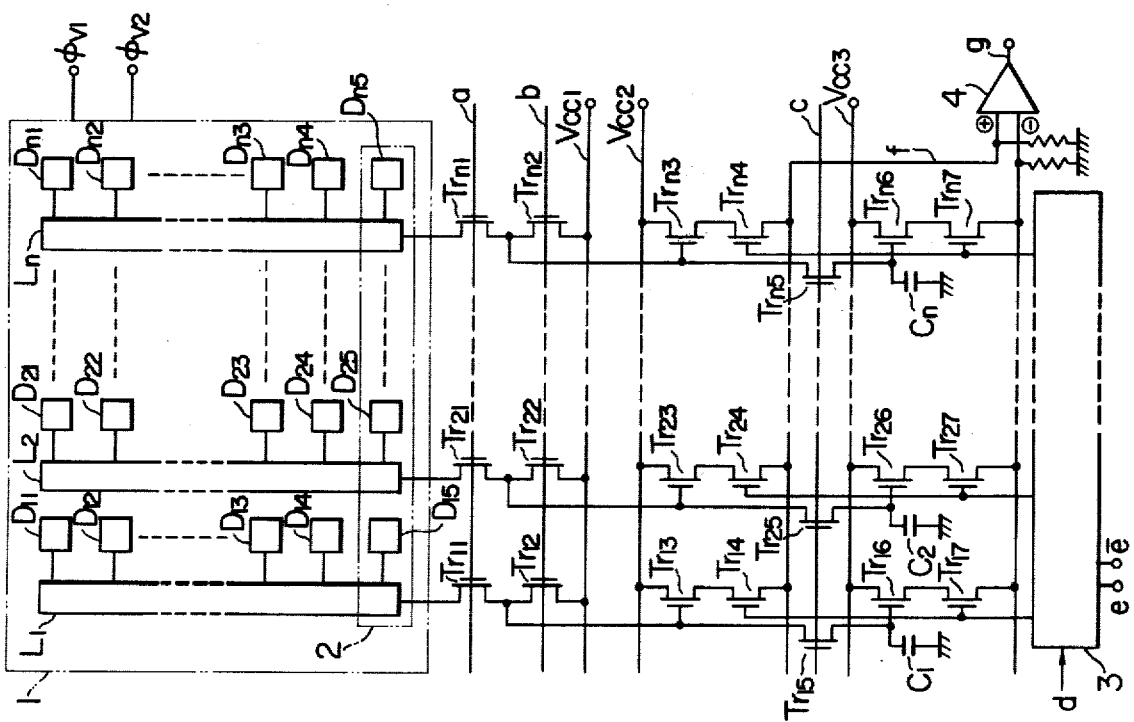
FIG. 1 is a schematic diagram of a first embodiment of the invention which incorporates a shift register for horizontal scanning.

Referring to FIG. 1, a first preferred embodiment of the invention will be described. A solid-state imaging apparatus as schematically shown in FIG. 1 generally comprises an imaging unit 1 including a light receiving section (image pickup section) and a light shielded section 2 comprising optically-shielded photodiodes to be described later, a scanning register 3 for generating sequential scanning pulses, and a differential amplifier 4 for producing the difference between a photoelectric signal and a signal stored in a capacitor to be described later. Of photodiodes $D_{11}$ to $D_{n5}$ constituting the imaging unit, the photodiodes of groups $D_{11}$ to $D_{15}$, $D_{21}$ to $D_{25}$, ..., $D_{n1}$ to $D_{n5}$ are respectively arranged in columns in a photodiode array. Photodiodes $D_{11}$ to $D_{14}$, $D_{21}$ to $D_{24}$ ... $D_{n1}$ to $D_{n4}$ are in the light receiving section of imaging unit while photodiodes $D_{15}$ to $D_{n5}$ are in the light shielded section 2. Vertical shifting sections $L_1$ to $L_n$ comprise BBDs. Each vertical shifting section includes the same number of stages as that of the photodiodes in one group. Photoelectric signals from each of the photodiode groups $D_{11}$ to $D_{15}$, $D_{21}$ to $D_{25}$, ..., $D_{n1}$ to $D_{n5}$ are simultaneously transferred to the stages of each of the vertical shifting sections, and the vertical shifting section shifts vertically the photoelectric signals transferred thereto. Transistors $T_{r11}$ to $T_{rn7}$ are MOS transistors, MOS transistors $T_{r11}$, $T_{r21}$, ..., $T_{rn1}$ are coupled together with their gates connected in common to a clock line a, and when timing pulses are applied to the clock line a, the photoelectric signals from the vertical shifting sections $L_1$ to $L_n$ are stored in gate capacitances (not shown) of MOS transistors $T_{r13}$, $T_{r23}$, ..., $T_{rn3}$. MOS transistors $T_{r12}$, $T_{r22}$, ..., $T_{rn2}$ are coupled together with their gates connected in common to a clock line b, and when timing pulses are applied to the clock line b, power supply voltage from a power supply line $V_{cc1}$ is applied via the MOS transistors $T_{r12}$, $T_{r22}$, ..., $T_{rn2}$ to the gate capacitances of MOS transistors $T_{r13}$, $T_{r23}$, ..., $T_{rn3}$ and stored therein. MOS transistors $T_{r14}$, $T_{r24}$, ..., $T_{rn4}$ and $T_{r17}$, $T_{r27}$, ..., $T_{rn7}$ are connected at their gates to the scanning register 3, and transistors are sequentially turned on such as $T_{r14}$ and $T_{r17} \rightarrow T_{r24}$ and $T_{r27} \rightarrow ... \rightarrow T_{rn4}$ and $T_{rn7}$. MOS transistors $T_{r15}$, $T_{r25}$, ..., $T_{rn5}$ are coupled together with their gates connected in common to a clock line c and upon application of pulses to the clock line c, the signals stored in the gate capacitors of the MOS transistors $T_{r13}$, $T_{r23}$, ..., $T_{rn3}$ are transferred to capacitors $C_1$, $C_2$, ..., $C_n$ and stored and held therein. Symbols $V_{cc1}$, $V_{cc2}$ and $V_{cc3}$ designate power supply lines.

Figure 2:
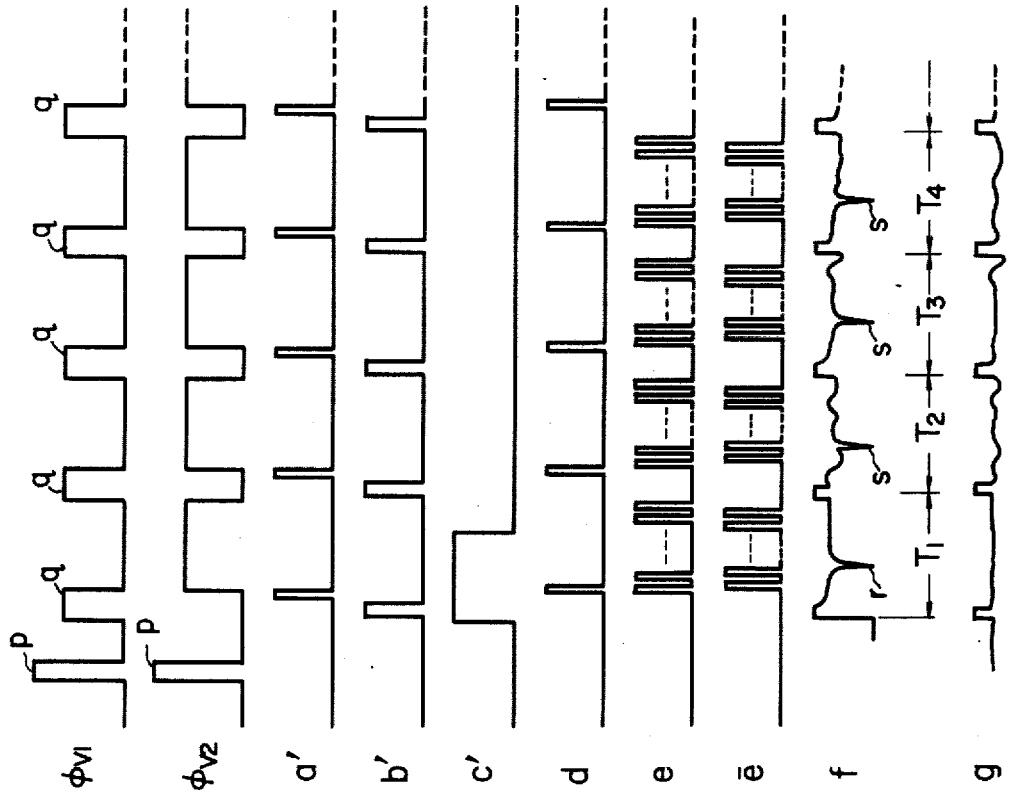
FIG. 2 is a wave-form chart to show clock signals and essential wave-forms in the embodiment of FIG. 1.

An operational description will be given of the solid-state imaging apparatus of FIG. 1 with reference to a wave-form chart as shown in FIG. 2. At first, clock pulses $\phi_{v1}$ and $\phi_{v2}$ are sequentially applied to the imaging unit 1 of the solid-state imaging apparatus. In particular, pulses p of the clock pulses $\phi_{v1}$ and $\phi_{v2}$ are timed to transfer photoelectric signals from the photodiodes $D_{11}$ to $D_{n5}$ to the stages of the vertical shifting sections $L_1$ to $L_n$, and the photoelectric signals are delivered out of the respective vertical shifting sections $L_1$ to $L_n$ one by one in parallel at timing of pulses q, leaving the imaging unit 1 of the solid-state imaging apparatus. These output signals are timed to clock pulse a' applied to the clock line a so as to be stored in the gate capacitances of the MOS transistors $T_{r13}$, $T_{r23}$, ..., $T_{rn3}$. In advance of such reading, charges at the gate capacitances of the MOS transistors $T_{r13}$, $T_{r23}$, ..., $T_{rn3}$ are required to be reset by applying clock pulse b' to the clock line b each one horizontal scanning period. After the storing of the signals from the optically shielded photodiodes $D_{15}$, $D_{25}$, ..., $D_{n5}$ in the light shield section 2 in the gate capacitance of the MOS transistors $T_{r13}$, $T_{r23}$, ..., $T_{rn3}$, they are transferred to the capacitors $C_1$, $C_2$, ..., $C_n$ and stored therein by applying clock pulse c' to the clock line c. It is to be noted that in place of one line or row of the optically shielded photodiode array as exemplified in the foregoing embodiment, two lines of shielded photodiode arrays may be arranged in the case of interlace scanning.

In this manner, in response to the first timing signal, only the signals from the optically shielded photodiodes are transferred to the capacitors $C_1$, $C_2$, ..., $C_n$ from the vertical shifting sections and these remain stored during one field or frame of the screen. Thereafter, as the clock pulses a' and b' are applied to the clock lines a and b each one horizontal scanning period, photo-information from the imaging unit 1 of the solid-state imaging apparatus is stored in the gate capacitances of the MOS transistors $T_{r13}$, $T_{r23}$, ..., $T_{rn3}$. On the other hand, start pulse d is applied to the scanning register 3 each one horizontal scanning period so that clock pulses e and ē can be fed to the scanning register 3. Then, the scanning register 3 sequentially produces drive pulses which are connected to turn on the pairs of MOS transistors $T_{r14}$ and $T_{r17}$, $T_{r24}$ and $T_{r27}$, ..., $T_{rn4}$ and $T_{rn7}$ sequentially. When the pair of MOS transistors $T_{r14}$ and $T_{r17}$ are turned on, the photoelectric signal stored in the gate capacitances of the MOS transistor $T_{r13}$ is sent to the positive terminal of the differential amplifier 4 and the signal of the optically shielded photodiode which has been stored in the capacitor $C_1$ is sent to the negative terminal of the differential amplifier 4, thus causing the differential amplifier 4 to produce a difference output. Assuming now that uniform defective charge is present on the respective stages of vertical shifting section $L_1$, the sum of the photoelectric signal and defect signal is stored in the gate capacitance of the MOS transistor $T_{r13}$ and only the defect signal is stored in the capacitor $C_1$. Accordingly, the differential amplifier 4 produces the output containing the photoelectric signal alone. Next, with the MOS transistors $T_{r24}$ and $T_{r27}$ turned on, the differential amplifier 4 produces only the photoelectric signal output as in the case of the MOS transistors $T_{r14}$ and $T_{r17}$ being turned on. By repeating the above operation, a series of signals removed of the defect signal can be delivered out of the differential amplifier 4 when the MOS transistors $T_{rn4}$ and $T_{rn7}$ are finally turned on.

To detail the operation set forth above, reference is made to pulses f and g as shown in FIG. 2. It is assumed that defect is present on only one of the vertical shifting sections $L_1$ to $L_n$. Then, during the first one horizontal scanning, i.e., period $T_1$, a signal in the form of pulse f is derived from the optically shielded photodiodes in the shield section 2, leaving the imaging unit 1 of the solid-state imaging apparatus. Because of complete absence of the photoelectric signal during period $T_1$, only one defect signal r is produced from the imaging unit. During the subsequent one horizontal scanning, i.e., period $T_2$, signal s is added to a photoelectric signal at a portion of the pulse f corresponding to the defect signal r. The same operation repeats during periods $T_3$, $T_4$, .... In accordance with the invention, since the defect signal produced during period $T_1$ is stored in the capacitors $C_1$ to $C_n$ and subjected to subtraction by signals produced during period $T_2$ and ensuing periods, a signal g removed of the defect signal can be obtained from the differential amplifier 4.

The invention can be implemented by using a charge transfer device such as a CCD or BBD in the horizontal scanning circuit.

Figure 3:
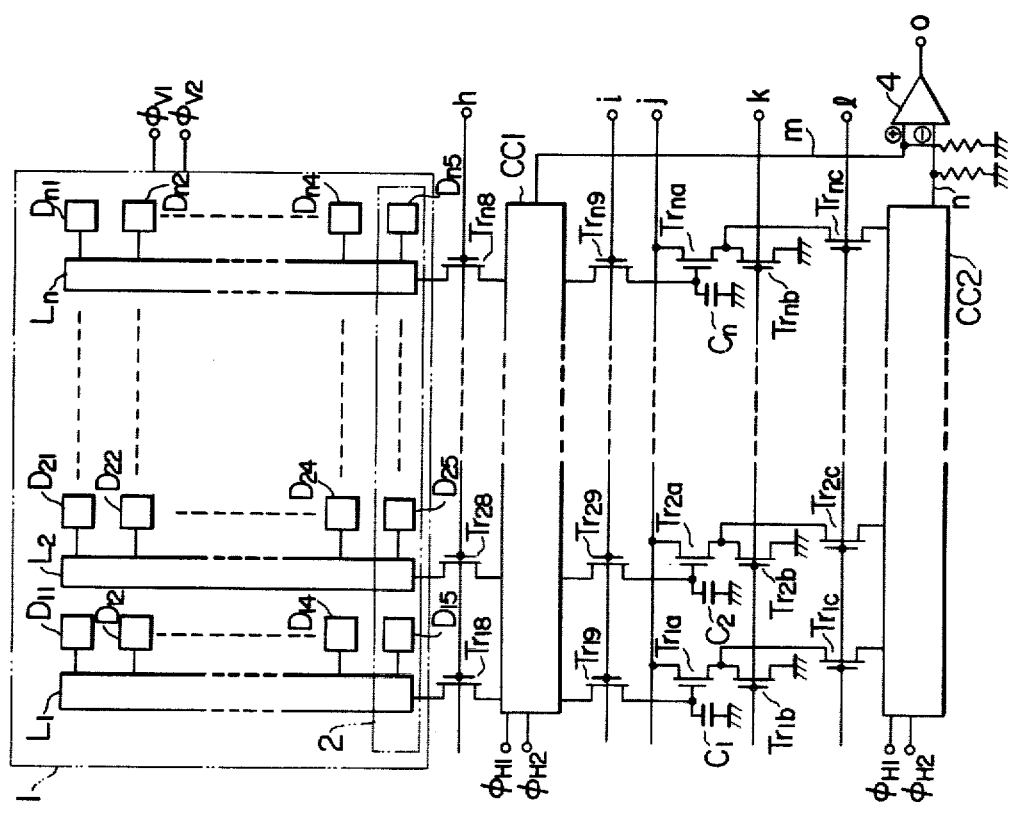
FIG. 3 is a schematic diagram of a second embodiment of the invention which incorporates charge coupling devices for horizontal scanning.

A second embodiment as shown in FIG. 3 uses charge transfer devices such as a CCD in the horizontal scanning circuit. In FIG. 3, the same elements as those in FIG. 1 are designated by the same reference numerals and not detailed herein. There are shown MOS transistors $T_{r18}$, $T_{r28}$, ... and $T_{rn8}$, $T_{r19}$, $T_{r29}$, ... and $T_{rn9}$, $T_{r1a}$, $T_{r2a}$, ... and $T_{rna}$, $T_{r1b}$, $T_{r2b}$, ... and $T_{rnb}$, and $T_{r1c}$, $T_{r2c}$, ... and $T_{rnc}$, charge coupled devices CC1 and CC2 for horizontal scanning, and clock lines h to l. The MOS transistors $T_{r18}$, $T_{r28}$, ..., $T_{rn8}$ are adapted to control transfer of image signals from the imaging unit to the charge coupling device CC1. Pairs of MOS transistors $T_{r1a}$ and $T_{r1b}$, $T_{r2a}$ and $T_{r2b}$, ..., $T_{rna}$ and $T_{rnb}$ are connected in source follower manner. DC voltage is applied to the clock line k to control current flowing through the transistors $T_{r1b}, T_{r2b}, \ldots, T_{rnb}$. The source-follower transistors are connected to a power supply through clock line j.

The vertical shift in the imaging unit is driven by clock pulses $\phi_{v1}$ and $\phi_{v2}$ as in FIG. 1. The charge coupled devices CC1 and CC2 are driven by clock pulses $\phi_{H1}$ and $\phi_{H2}$. Signal charges are transferred, under the control of the transistors $T_{r19}, T_{r29}, \ldots, T_{rn9}$, from the device CC1 to capacitors $C_1, C_2, \ldots C_n$ and stored therein. The transistors $T_{r1c}, T_{r2c}, \ldots, T_{rnc}$ constitute a control gate for connecting outputs of the source-follower transistor pairs $T_{r1a}$ and $T_{r1b}, \ldots, T_{rna}$ and $T_{rnb}$ to the device CC2.

The imaging apparatus of FIG. 3 operates as will be described with reference to a wave-form chart shown in FIG. 4. Description will first be given of the operation during period $T_1$ which is in advance of driving the vertical shifting sections. The device CC1 is always kept operating. Since there is no pulse applied to the clock line h during period $T_1$, the device CC1 maintains the state in the absence of input signals, i.e., high level state. On the other hand, the transistors $T_{r19}, T_{r29}, \ldots T_{rn9}$ are turned on by pulse i' during period $T_1$ so that the capacitors $C_1, C_2, \ldots, C_n$ for storing signals are reset to high level.

Also, during period $T_1$, no pulse l' is applied to the clock line l to disable the transistors $T_{r1c}, T_{r2c}, \ldots, T_{rnc}$ and the device CC2 thus receiving no input signals is also reset to high level.

During subsequent period $T_2$, the vertical shifting sections $L_1, L_2, \ldots, L_n$ initially send output signals. The output signal corresponds to a dark state signal from the optically shielded photodiodes as shown in FIG. 3.

During period $T_2$, pulses h', i' and l' are applied to the clock lines h, i and l to turn on the transistors $T_{r18}$ to $T_{rn8}, T_{r19}$ to $T_{rn9}$ and $T_{r1c}$ to $T_{rnc}$. As a result, the output signals of the imaging unit are sent to the device CC1 via the transistors $T_{r18}$ to $T_{rn8}$ and the signal charges are stored in the capacitors $C_1$ to $C_n$ through the transistors $T_{r19}$ to $T_{rn9}$. The charges thus stored and the capacitances of capacitors $C_1$ to $C_n$ determine gate potentials of the transistors $T_{r1a}$ to $T_{rna}$, and charges are sent to the device CC2 in accordance with the gate voltages via the transistors $T_{r1c}$ to $T_{rnc}$. The dark state signal is representative of a line defect signal due to white and black lines in the imaging unit.

Figure 4:
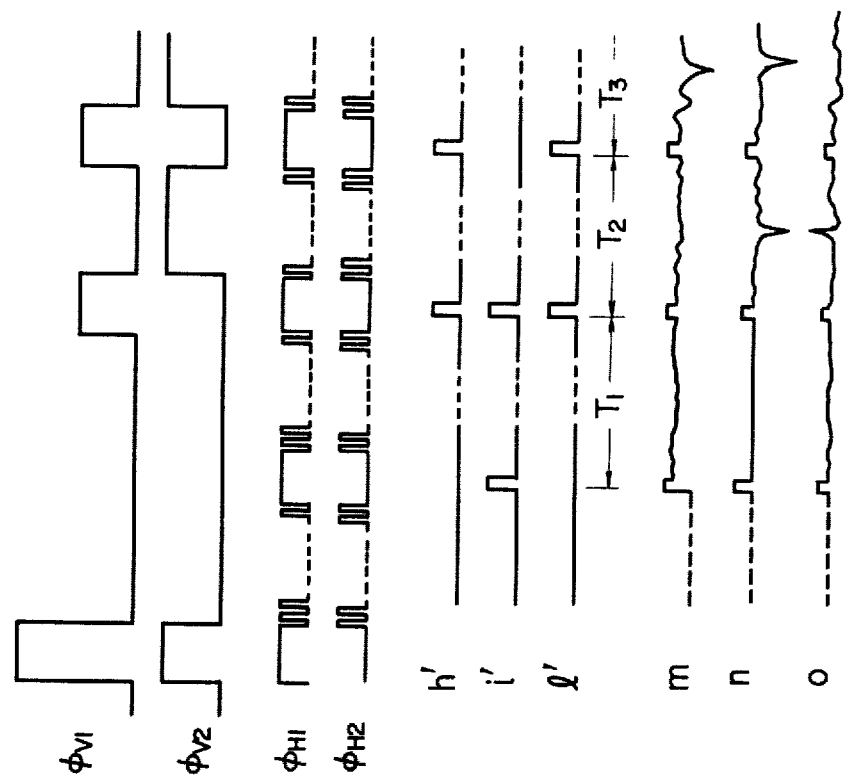
FIG. 4 is a wave-form chart to show clock signals and essential wave-forms in the embodiment of FIG. 3.

The signal from the light shield section 2 does not remain in the device CC1 and during timing period $T_2$, the devices CC1 and CC2 produce outputs m and n as shown in FIG. 4. The outputs m and n are differentiated at the differential amplifier 4 to produce therefrom a signal 0 representative of only the line defect. During period $T_3$, photoelectric signals in the imaging unit are vertically shifted. Then, pulse h' is applied to the clock line h and image signals are allowed to come into the device CCD1. The image signal contains a line defect signal but in the absence of pulse i', the charged state of the capacitors $C_1$ to $C_n$ remains unchanged. Pulse l' is, however, applied to the clock line l during period $T_3$ and only the line defect signal under the dark state is again sent to the device CC2. During period $T_3$, output signals of the devices CC1 and CC2 are passed through the differential amplifier 4 so that output n of the CC2 representative only of the line defect signal and output m of the CC1 representative of the image signal containing the line defect signal are differentiated, thereby producing only an image signal 0 as shown in FIG. 4. The charged state of the capacitors $C_1$ to $C_n$ is changed by applying pulse i' to the clock line i at the beginning of every one frame.

As described above, according to the invention, the solid-state imaging apparatus per se is so constructed that the line defects due to manufacturing process can be corrected and high quality images can be produced.

We claim:

1. A solid-state imaging apparatus comprising:
   an imaging unit including a light receiving section for picking up an optical image signal by horizontal scanning and a light shielded section provided in parallel with the direction of horizontal scanning and over an area scanned by said horizontal scanning, said light shielded section being shielded from said optical image signal;
   means for reading out respective signals from said light receiving and light shielded sections;
   a memory unit for storing signals from said light shielded section during read out of signals from the light receiving section; and
   differential means for differentiating signals from the light receiving section and signals stored in the memory unit.

2. A solid-state imaging apparatus according to claim 1 wherein the differential means comprises a differential amplifier.

3. A solid-state imaging apparatus according to claim 1 wherein said imaging unit comprises a plurality of light receiving elements arranged in rows and columns to form an array, the light receiving section being formed by predetermined rows of said elements and the light shielded section being formed by at least one other predetermined row of elements, said reading means comprising shifting means for shifting the signals of the light receiving and light shielded sections along said columns.

4. A solid-state imaging apparatus according to claim 3 wherein the memory unit comprises a capacitor associated with each said column of the imaging unit, and further comprising a charge coupled device for transferring signals stored in said capacitors to said differential means.

5. A solid state imaging apparatus according to claim 4 further comprising a charge coupled device for transferring signals of the light receiving section of the imaging unit to said differential means.

6. A solid state imaging apparatus comprising:
   an imaging unit formed by a plurality of light receiving elements arranged in rows and columns, said imaging unit including a non-shielded light receiving section defined by predetermined rows of said elements which are exposed to an optical image signal and a light shielded section defined by at least one other predetermined row of said elements shielded from said optical image signal;
   means for columnwise shifting signals from said plurality of light receiving elements out of said imaging unit;
   memory means for storing signals from the shielded light receiving elements as they are shifted from said imaging unit; and,
   means for subtracting signals stored in said memory means for a particular column from signals from the non-shielded light receiving elements of an associated column as the signals from said non-shielded light receiving elements are shifted from said imaging unit, said subtracting means including means for sequentially subtracting an associated non-shielded light receiving element signal and a shielded light receiving element signal for a respective column across each of the columns of said imaging unit.

* * * * *